US012631938B2

(12) United States Patent
Pronin et al.

(10) Patent No.: US 12,631,938 B2
(45) Date of Patent: May 19, 2026

(54) DEVICE AND METHOD FOR NONLINEAR OPTICAL FREQUENCY-CONVERSION

(71) Applicant: Helmut-Schmidt-Universität / Universität der Bundeswehr Hamburg, Hamburg (DE)

(72) Inventors: Oleg Pronin, Hamburg (DE); Kilian Fritsch, Hamburg (DE); Victor Hariton, Hamburg (DE); Nazar Kovalenko, Hamburg (DE)

(73) Assignee: Helmut-Schmidt-Universität / Universität der Bundeswehr Hamburg, Hamburg (DE)

( * ) Notice: Subject to any disclaimer, the term of this patent is extended or adjusted under 35 U.S.C. 154(b) by 287 days.

(21) Appl. No.: 18/691,004

(22) PCT Filed: Aug. 9, 2022

(86) PCT No.: PCT/EP2022/072388
§ 371 (c)(1),
(2) Date: Mar. 11, 2024

(87) PCT Pub. No.: WO2023/036541
PCT Pub. Date: Mar. 16, 2023

(65) Prior Publication Data
US 2024/0402567 A1 Dec. 5, 2024

(30) Foreign Application Priority Data
Sep. 13, 2021 (EP) ..................................... 21196437

(51) Int. Cl.
*G02F 1/35* (2006.01)
*G02F 1/355* (2006.01)
*G02F 1/39* (2006.01)

(52) U.S. Cl.
CPC .......... *G02F 1/3503* (2021.01); *G02F 1/3534* (2013.01); *G02F 1/3544* (2013.01);
(Continued)

(58) Field of Classification Search
CPC ..................................................... G02F 1/3542
See application file for complete search history.

(56) References Cited

U.S. PATENT DOCUMENTS 3,824,717 A 7/1974 Evtuhov et al.
5,289,491 A * 2/1994 Dixon ....................... G02F 1/37
372/99
(Continued)

OTHER PUBLICATIONS

J. Armstrong et al., "Interactions between Light Waves in a Nonlinear Dielectric," Physical Review, vol. 127, No. 6, pp. 1918 to 1939, Sep. 1962.
(Continued)

*Primary Examiner* — Rhonda S Peace
(74) *Attorney, Agent, or Firm* — Pearl Cohen Patentanwälte PartGmbB; Michael McCandlish

(57) ABSTRACT

A device for a nonlinear optical frequency-conversion of laser radiation comprises a multipass arrangement being arranged such that a laser radiation coupled into the multipass arrangement carries out multiple roundtrips in the multipass arrangement. The device further comprises a nonlinear optical medium-arranged at least partly within the multipass arrangement such that at least in several of the roundtrips the laser radiation coupled into the multipass arrangement passes through the nonlinear optical medium to carry out a nonlinear optical conversion of a part of the laser radiation propagating through the nonlinear optical medium into frequency-converted components based on a second order susceptibility $\chi^{(2)}$ of the nonlinear optical medium. The device is configured such that the laser radiation- and the frequency-converted components propagate in the mul-
(Continued)

tipass arrangement-along a common beam path including at least five passes through the nonlinear optical medium.

43 Claims, 6 Drawing Sheets

(52) U.S. Cl.
CPC ............ *G02F 1/3551* (2013.01); *G02F 1/392* (2021.01); *G02F 2201/17* (2013.01); *G02F 2201/34* (2013.01)

(56) References Cited

U.S. PATENT DOCUMENTS

| | | | |
|---|---|---|---|
| 5,321,718 | A | 6/1994 | Waarts et al. |
| 9,857,659 | B2 * | 1/2018 | Katsuragawa ........... G02B 5/30 |
| 11,435,646 | B2 * | 9/2022 | Ogawa ................... G02F 1/3503 |
| 2002/0095142 | A1 | 7/2002 | Ming |
| 2024/0402567 | A1 * | 12/2024 | Pronin ................... G02F 1/3542 |

OTHER PUBLICATIONS

T. Harimoto et al., "A novel multipass scheme for enhancement of second harmonic generation," Optics Express, vol. 19, No. 23, pp. 22692 to 22697, Oct. 2011.

S. Kurimura et al., "Quartz revisits nonlinear optics: twinned crystal for quasi-phase matching [Invited]," Optical Materials Express, vol. 1, No. 7, pp. 1367 to 1375, Oct. 2011.

K. Fritsch et al., "All-solid-state multipass spectral broadening to sub-20 fs," Optics Letters, vol. 43, No. 19, pp. pp. 4643 to 4646, Sep. 2018.

M. Kaumanns et al., "Multipass spectral broadening of 18 mJ pulses compressible from 1.3 ps to 41 fs," Optics Letters, vol. 43, No. 23, pp. 5877 to 5880, Nov. 2018.

M. Hanna et al., "Hybrid pulse propagation model and quasi-phase-matched four-wave mixing in multipass cells," Journal of the Optical Society of America B, vol. 37, No. 10, pp. 2982 to , 2988, Oct. 2020.

J. Gu et al., "Random quasi-phase-matching in polycrystalline media and its effects on pulse coherence properties," Optics Express, vol. 29, No. 5, pp. 7479 to 7493, Feb. 2021.

International Search Report and Written Opinion issued in PCT/EP2022/072388, to which this application claims priority, mailed Dec. 15, 2022.

Kleinman, "Theory of Second Harmonic Generation of Light", Physical Review, vol. 128, No. 4, pp. 1761 to 1775, Nov. 1962.

Muzart et al., "Generation de Second Harmonique Non Colineaire et Colineaire dans ZnS. Accord de Phase ("Phase Matching") par la Structure Lamellaire du Cristal", Optics Communications, vol. 6, No. 4, pp. 329 to 332, Dec. 1972., English machine-translation attached.

Hocker et al., "Enhancement of second-harmonic generation in zinc selenide by crystal defects", Applied Physics Letters, vol. 28, No. 5, pp. 267 to 270, Mar. 1976.

Szilagyi et al., "A quasi-phase-matching technique for efficient optical mixing and frequency doubling", Journal of Applied Physics, vol. 47, No. 5, pp. 2025 to 2032, May 1976.

Mizushima et al., "Second Harmonic Generation with High Conversion Efficiency and Wide Temperature Tolerance by Multi-Pass Scheme", Applied Physics Express, vol. 1, No. 3, p. 32003-1 to 32003-3, Mar. 2008.

* cited by examiner

DEVICE AND METHOD FOR NONLINEAR OPTICAL FREQUENCY-CONVERSION

CROSS REFERENCE TO RELATED APPLICATIONS

This application is a national stage of international patent application PCT/EP2022/072388, filed on Aug. 9, 2022, and designating the U.S., which claims priority to European patent application EP 21 196 437.4, filed on Sep. 13, 2021, both of which are hereby incorporated by reference in their entireties.

TECHNICAL FIELD

The disclosure relates to a device for a nonlinear optical frequency-conversion of laser radiation, a laser system, a use of a multipass arrangement for nonlinear optical frequency-conversion of laser radiation, and a method for frequency-converting laser radiation. The embodiments are, thus, related to nonlinear optics and laser technology.

BACKGROUND

Coherent optical radiation, such as laser radiation, having a high intensity is relevant for numerous fields, such as material processing, measurement devices, spectroscopic applications and medical technology. However, conventional sources for coherent optical radiation are limited to specific spectral ranges, in which the laser radiation can be provided. Providing laser radiation in other wavelength ranges is often not possible or requires a high technical effort and complicated and expensive devices.

One conventional technique to access such spectral regions is optical parametric generation of optical radiation, which is a way to generate coherent radiation in spectral regions in which no laser sources are available. To obtain parametric conversion of radiation, typically the following conditions are to be met:

1) Presence of a nonlinear optical medium which is transparent for the pump and signal wavelengths and has a non-zero nonlinear susceptibility.
2) Satisfying a phase-matching condition.
3) A sufficient intensity and interaction length between the nonlinear-optical medium and the radiation.

One of the conventionally known methods of parametric conversion is quasi-phase-matching (QPM) (Szilagyi, A.; Hordvik, A.; Schlossberg, H. (1976): *A quasi-phase-matching technique for efficient optical mixing and frequency doubling*. In Journal of Applied Physics 47 (5), pp. 2025-2032. DOI: 10.1063/1.322930). QPM has become a widely used method for solving a number of nonlinear optics problems. The advantage of crystals made for parametric conversion with QPM is a large length of nonlinear interaction as compared to homogeneous crystals. However, the length and, thus, the interaction length is limited by the technologies of growing a single-crystal element and creating periodically polarized single crystals of ferroelectrics.

Moreover, the existing manufacturing technologies of nonlinear periodically polarized structures (PPXX) are effective only for a very limited number of crystalline materials, namely ferroelectrics, which can be polarized by changing the crystal structure direction under a high-intensity external electric field. Attempts to develop commercially applicable technologies for creating periodic structures based on other classes of nonlinear optical materials have not yet achieved significant success, which limits the scope application of this method of parametric conversion (Muzart J et al. (1972): *Generation de Second Harmonique Non Colineaire et Colineaire dans ZnS. Accord de Phase ("Phase Matching") par la Structure Lamellaire du Cristal*. In Opt. Communic.; Netherl. Vol. 6 (4), pp. 329-332; and Hocker et al. (1976): Enhancement of second-harmonic generation in zinc selenide by crystal defects. In Appl. Phys. Lett. 28 (5), pp. 267-270. DOI: 10.1063/1.88722; Kurimura, Sunao et al., Tokio (2011): *Quartz revisits nonlinear optics: twinned crystal for quasi-phase matching [Invited]*. Optical Materials Express, 1 (7), 1367. DOI: 10.1364/OME.1.001367).

In context of the parametric conversion T. Mizushima and coauthors [Mizushima et al.: *Second Harmonic Generation with High Conversion Efficiency and Wide Temperature Tolerance by Multipass Scheme*, in Appl. Phys. Express 1, p. 32003 (2008). DOI: 10.1143/APEX.1.032003] attempted to increase the length of nonlinear interaction by increasing the number of passes of the laser radiation in a nonlinear optical medium by placing it inside a multipass cell. It consists of a pair of concave mirrors. However, the proposed scheme is limited in its applicability, as multiple laser beams are coupled out from the multipass arrangement with spatial separation, which renders a useful application of provided application demanding. The number of separately out-coupled beams number is equal to the number of reflections of the pump radiation from one of the mirrors. Moreover, the use of a thin PPLN nonlinear optical medium having a thickness of 1 mm limits multipassing only in the plane of the nonlinear element.

In the work by Tetsuo et al.: *A novel multipass scheme for enhancement of second harmonic generation* 19 (23), p. 22692 (2011), it is shown that two transmissions of the laser radiation through a nonlinear element in a non-collinear phase-matching configuration are possible. However, this solution does not provide a solution of implementing a large number of passes of laser radiation through a nonlinear optical medium. In the publication by Marc Hanna et al. *Hybrid pulse propagation model and quasi-phase-matched four-wave mixing in multipass cells"*, J. Opt. Soc. Am. B 37, 2982-2988 (2020), the authors suggest the possibility of realizing four-wave interaction, which is by definition a $\chi^{(3)}$-based nonlinear process in the QPM mode in a gas-filled multipass cell.

SUMMARY

One object of the disclosure can relate to providing a method and a device for efficient nonlinear optical frequency-conversion of laser radiation allowing the use of laser radiation having moderate intensities and/or the use of nonlinear optical mediums having a moderate nonlinear susceptibility.

A device for a nonlinear optical frequency-conversion of laser radiation can be provided. The device comprises a multipass arrangement being arranged such that a laser radiation coupled into the multipass arrangement carries out multiple roundtrips in the multipass arrangement. The device further comprises a nonlinear optical medium arranged at least partly within the multipass arrangement such that at least in several of the roundtrips the laser radiation coupled into the multipass arrangement passes through the nonlinear optical medium to carry out a non-linear optical conversion of a part of the laser radiation propagating through the nonlinear optical medium into frequency-converted components based on a second order susceptibility $\chi^{(2)}$ of the nonlinear optical medium. The device is configured such that the laser radiation and the frequency-converted components propagate in the multipass arrangement along a common beam path including at least five passes through the nonlinear optical medium.

A laser system comprising a device for nonlinear optical conversion of laser radiation as described herein can be provided.

The disclosure can relate to a use of a multipass arrangement for nonlinear optical frequency-conversion of laser radiation coupled into the multipass arrangement into frequency-converted components, wherein the multipass arrangement is configured such that the laser radiation coupled into the multipass arrangement carries out multiple roundtrips in the multipass arrangement. At least in several of the roundtrips passes through a nonlinear optical medium arranged at least partly within the multipass arrangement to carry out a nonlinear optical conversion of a part of the laser radiation propagating through the nonlinear optical medium into frequency-converted components based on a second order susceptibility $\chi^{(2)}$ of the nonlinear optical medium. The laser radiation and the frequency-converted components propagate in the multipass arrangement along a common beam path including at least five passes through the nonlinear optical medium.

The disclosure can relate to a use of a multipass arrangement and a nonlinear optical medium arranged at least partly within the multipass arrangement for a nonlinear optical frequency conversion of laser radiation coupled into the multipass arrangement into frequency-converted components based on a second order susceptibility $\chi^{(2)}$ of the nonlinear optical medium, wherein the multipass arrangement has at least a first mirror and a second mirror being highly-reflective for the laser radiation and the frequency converted components.

The disclosure can relate to a method for frequency-converting laser radiation. The method comprises coupling the laser radiation into a multipass arrangement such that the laser radiation coupled into the multipass arrangement carries out multiple roundtrips in the multipass arrangement, wherein a nonlinear optical medium is arranged at least partly within the multipass arrangement and at least in some of the several roundtrips the laser radiation passes through the nonlinear optical medium and carries out a nonlinear optical conversion of a part of the laser radiation into frequency-converted components. The method further comprises adjusting a phase-matching between the laser radiation and the frequency-converted components between two consecutive passes of the laser radiation through the nonlinear optical medium.

The term "laser radiation" is used in the present disclosure for any kind of electromagnetic radiation, which may be frequency convertible by a nonlinear optical process, optionally coherent electromagnetic radiation. The laser radiation may originate in a laser oscillator and may optionally be further amplified in a laser amplifier and/or in an optical parametric amplification stage. The laser radiation may be referred to as pumping laser radiation of a fundamental wavelength used to pump the nonlinear optical frequency conversion. The laser radiation coupled into the multipass arrangement may optionally further include a seed laser radiation having a wavelength corresponding to the frequency converted spectral components.

A multipass arrangement can be an arrangement of optical elements which deflects a laser radiation coupled into the multipass arrangement in such a way that it propagates several times in the multipass arrangement before the laser radiation is coupled out of the multipass arrangement. The redirection of the laser radiation optionally takes place by reflections of the laser radiation, so that the laser radiation changes its propagation direction in the multipass arrangement. In contrast to arrangements which guide the laser radiation by means of optical fibers through total internal reflection, in the multipass arrangement propagation of the laser radiation may take place in free space without a mode of the laser radiation being restricted by an optical fiber at any point along the optical path of the laser beam or laser pulse.

The roundtrips of the laser radiation in the multipass arrangements may each have substantially similar optical paths through the multipass arrangement. In every or most of the roundtrips the laser radiation may be deflected by the same optical elements of the multipass arrangement. The first roundtrip may include an incoupling and/or the last roundtrip may include an outcoupling of the laser radiation into/out of the multipass arrangement and, thus, the first and/or the last roundtrip may deviate from the other roundtrips with respect to the optical elements deflecting the laser radiation. Optionally a roundtrip does not exactly revert the optical path of the laser radiation propagating in the multipass arrangement but after completing one entire roundtrip, the laser radiation may hit the respective optical element at a position strongly deviating from the position at the beginning of the roundtrip. In contrast to a resonator, the laser radiation may propagate in the multipass arrangement on an individual optical path in each roundtrip, wherein the individual optical paths may not overlap with each other.

The nonlinear optical medium may be a medium being optically transparent for the laser radiation and having a nonlinear susceptibility. The nonlinear optical medium may be suitable for carrying out a nonlinear optical conversion of a part of the laser radiation propagating through the nonlinear optical medium. The nonlinear optical conversion may be a frequency conversion of the laser radiation into a wave-mixing product, such as a harmonic radiation having a frequency which is a positive integer multiple of the frequency of the laser radiation. The optical frequency conversion may be an optical parametric process. The nonlinear optical frequency conversion may be a passive process, which in contrast to laser processes may not be based on pumping an active medium for providing a population inversion. Accordingly, the device and/or the multipass arrangement may be a passive device. The nonlinear optical conversion being based on a second order susceptibility $\chi^{(2)}$ may mean that the conversion is based on a three-wave-mixing process, such as second harmonic generation, sum-frequency generation, difference-frequency generation, and/or optical parametric amplification. Accordingly, the nonlinear optical medium may offer a second order nonlinear susceptibility supporting such nonlinear optical processes.

A pass of the laser radiation through the nonlinear optical medium may mean a propagation of the laser radiation through the nonlinear optical medium. Each roundtrip of the laser radiation in the multipass arrangement may include two passes through the nonlinear optical medium, for instance one pass in a first direction and one pass in a second direction being opposite to the first direction. Each roundtrip may include only one pass through the nonlinear optical medium. For instance, the optical path of the roundtrip may be configured such that the laser radiation passes through the nonlinear optical medium only in one direction but does not pass through the nonlinear optical medium in a second direction. Each roundtrip may include more than one pass through the nonlinear optical medium. Some roundtrips may not include a pass through the nonlinear optical medium. For instance, the device may be arranged such that in some roundtrips, such as directly after coupling the laser radiation into the multipass arrangement and/or directly before coupling the laser radiation out of the multipass arrangement, no pass through the nonlinear optical medium is included.

The laser radiation and the frequency-converted components propagating along a common beam path may mean that the laser radiation and the frequency converted components propagate together for one or more roundtrips through the multipass arrangement until the laser radiation and the frequency converted components may be coupled out from the multipass arrangement together. The multipass arrangement may comprise mirrors which are highly reflective for the laser radiation as well as for the frequency converted components. The multipass arrangement may be arranged such that the frequency converted components do not leak through one or more mirrors, which are reflective for the laser radiation. While propagating along the common beam path, the laser radiation and the frequency converted components may have a spatial and/or temporal overlap with each other.

Multiple passes of the laser radiation through the nonlinear optical medium can be achieved and by this the effective nonlinear interaction length may be increased. Accordingly, laser radiation of moderate intensity may be enabled to carry out optical frequency-conversion processes, since a long effective nonlinear interaction length can be achieved and, thus, a high conversion efficiency can be achieved also for modest intensities. The parametric interaction of the laser radiation and the frequency converted components in each pass through the nonlinear optical medium can be kept within the Rayleigh length of a focused laser radiation in each passage and, thus, a high and necessary intensity of the focused laser radiation within the nonlinear optical medium can be ensured, which enhances the conversion efficiency and may be required for carrying out the non-linear optical process. The nonlinear optical frequency-conversion may be applied to a continuous wave laser radiation, which may have a moderate power compared to pulsed laser radiation having a comparable average power.

An effective nonlinear interaction length can be achieved, which is significantly longer than the actual physical length of the nonlinear optical medium. The effective nonlinear interaction length may correspond to the sum of the optical lengths of all passes through the nonlinear optical medium, which may correspond to the physical length of the nonlinear optical medium multiplied by the number of passes through the nonlinear optical medium.

A nonlinear optical medium having a moderate second order nonlinear susceptibility can be used, since a high conversion efficiency can be achieved by a long effective nonlinear interaction length. This may allow using nonlinear optical crystals as a nonlinear optical medium, which may be easy to manufacture and/or may be cheaper to provide. The frequency conversion may be based on a second order susceptibility, which may provide a higher conversion efficiency than other processes based on a third or higher nonlinear susceptibility.

A nonlinear optical medium having a moderate damage threshold can be used. A low damage threshold may originate in technical reasons, as for instance in the crystalline material being new and/or a growth process for the crystalline material not being significantly developed. The material of the nonlinear optical medium may have an intrinsically (naturally) low damage threshold.

The laser radiation and the frequency converted components may propagate on a common beam path. This may allow ensuring that a spatial and temporal overlap between the laser radiation and the frequency converted components may be maintained and, hence, may allow providing the frequency converted components as one single beam and/or pulse, which is in contrast to conventional methods based on the second harmonic radiation leaking through mirrors reflecting the fundamental radiation.

Thus, devices and methods which combine the advantages of parametric conversion with quasi-phase matching (QPM) in an arbitrary nonlinear optical medium may be provided and significant nonlinear interaction lengths in multipass arrangements may be provided.

The laser radiation and the frequency-converted components may be concentrically centered at a different position of the nonlinear optical medium at each of the at least five passes through the nonlinear optical medium. In other words, the laser radiation and the frequency converted components may at least partly overlap with each other within the nonlinear optical medium and exhibit an at least slightly different trajectory through the nonlinear optical medium in each pass through the nonlinear optical medium compared to previous passes through the nonlinear optical medium. Therefore, the intensity within the nonlinear optical medium can be distributed over a larger transversal area of the nonlinear optical medium and, hence, the occurrence of the temperature gradients and thermal effects may be reduced. Optionally the beams do not exactly overlap in different passes in the nonlinear optical medium. Thus, the peak intensity within the nonlinear optical medium may be limited.

The multipass arrangement may be arranged such that a laser radiation coupled into the multipass arrangement carries out at least ten and optionally not more than 100 roundtrips in the multipass arrangement. The common beam path may include at least ten passes through the nonlinear optical medium. The device may be configured to offer a number of roundtrips which is much higher than ten roundtrips. This may allow to (optionally further) increase the effective nonlinear interaction length and, hence, the conversion efficiency.

The nonlinear optical conversion of the laser radiation into the frequency-converted components may be essentially solely based on the second order susceptibility $\chi^{(2)}$ of the nonlinear optical medium. In other words, no nonlinear optical process, which is based on a third order nonlinear optical susceptibility $\chi^{(3)}$ or an even higher order, may be used. Therefore, a high conversion efficiency may be achieved at moderate intensities of the laser radiation. The nonlinear optical conversion of the laser radiation into the frequency-converted components may be based, for example, on three-wave-mixing and may optionally be based on at least one of the following nonlinear optical processes: second harmonic generation, sum-frequency generation, optical parametric amplification and difference-frequency generation.

The device may be configurable to adjust a phase-matching between the laser radiation and the frequency-converted components in each of the several roundtrips. This may allow improving and/or optimizing the conversion efficiency by configuring and/or adjusting the device. The device may be configurable to adjust the phase-matching condition such that at least in one pass through the nonlinear optical medium per roundtrip and optionally in every pass per roundtrip the phase-matching between the laser radiation and the frequency-converted components generated in previous passes may be suitable and/or optimized for a conversion of the laser radiation into the frequency converted components. Hence, the phase-matching may be adjustable such as to enhance and/or optimize the nonlinear optical conversion of the laser radiation into the frequency-converted components. This may allow achieving a high conversion efficiency in a large number of roundtrips and passes and hence may enable laser radiation of modest power and/or intensity to carry out nonlinear optical frequency conversion processes.

A linear optical medium may be arranged at least partly within the multipass arrangement such that the laser radiation passes through the linear medium at least in those several roundtrips, in which the laser radiation passes at least once through the nonlinear optical medium. In other words, optionally the nonlinear optical medium does not cover the whole beam path of laser radiation propagating through the multipass arrangement. This may allow providing a beam path through the multipass arrangement having alternating sections wherein some of the sections may exhibit a significant nonlinear optical susceptibility and the other (linear) sections having essentially no nonlinear optical susceptibility. A medium may be regarded as a linear optical medium and as having essentially no nonlinear optical susceptibility if the nonlinear optical susceptibility is 0.1 pm/V or less at the central wavelength of the laser radiation, which may be at 800 nm. In contrast, the nonlinear optical medium may have a nonlinear optical susceptibility of 0.2 pm/V or higher and optionally of 0.5 pm/V or higher.

The linear optical medium may comprise a vacuum and/or a gaseous medium and/or a solid linear optical medium, and the device may be configurable to adjust a phase-matching by adjusting an optical path length in the linear optical medium. This may allow adjusting the optical path length within the linear optical medium such that at each roundtrip and/or at each pass a suitable phase-matching of the laser radiation and the frequency converted components may be restored. The optical path length within the linear optical medium may be adjusted such that at each pass or at each second pass through the nonlinear optical medium a relative phase of the laser radiation and the frequency converted components is within optimal range for the efficient conversion (from 0 to $\pi$ for the media with positive nonlinear coefficient and $\pi \ldots 2\pi$ for negative one). A definition of the relative phase can be found for instance in the following publication:

J. A. Armstrong, N. Bloembergen, J. Ducuing. P. S. Pershan (1962): *Interactions between Light Waves in a Nonlinear Dielectric. In Physical Review* 127 (6), pp. 1918-1939.

The optical path length within the linear optical medium may be chosen, such that different propagation velocities of the laser radiation and the frequency converted components due to their different frequencies originating in the optical dispersion of the linear optical medium results in a zero phase-mismatch when entering the nonlinear optical medium at each pass or at least once per roundtrip.

The multipass arrangement may have at least a first mirror and a second mirror and in each roundtrip the laser radiation may be reflected at least once from the first mirror to the second mirror and at least once from the second mirror to the first mirror. The first and the second mirror may confine the multipass arrangement. Further optical elements may be arranged within the multipass arrangement. The first and the second mirror may be concave curved mirrors. The first mirror may be a concave curved mirror and the second mirror may be a convex curved mirror or vice versa. This may allow providing a reflective multipass arrangement wherein the essential optical elements are reflective and wherein only minor optical elements or no optical elements are transmissive optical elements. This may allow keeping the optical dispersion originating in the optical elements of the multipass arrangement at a low level. The multipass arrangement may comprise a Herriott cell or may be configured as a Herriott cell.

The first mirror and the second mirror may be highly-reflective for the laser radiation and for the frequency-converted components. This may facilitate providing a mutual beam path for the laser radiation and the frequency converted components. This may prevent the frequency-converted components leaking through the first and/or the second mirror, which would result in several different beams of frequency converted components being coupled out of the multipass-arrangement.

The device may be adapted to allow a variation of a distance between the first mirror and the second mirror to adjust the optical length of the linear optical medium. This may facilitate adjusting the phase-matching between the laser radiation and the frequency converted components in each roundtrip and/or in each pass through the nonlinear optical medium.

The first mirror and/or the second mirror may be adapted to adjust at least partly the phase-matching between the laser radiation and the frequency converted components. In other words, the phase-matching between the laser radiation and the frequency converted components may be at least partly carried out by the first mirror and/or the second mirror. Therefore, the device may be formed in a particular compact manner, as the function of adjusting phase-matching is at least partly carried out by the first mirror and/or second mirror.

The first mirror and the second mirror may comprise a dispersive coating for adjusting at least partly the phase-matching between the laser radiation and the frequency converted components. This may allow providing the option of adjusting the phase-matching in an efficient manner as no separate, further optical elements may be necessarily required for adjusting the phase-matching conditions.

The first mirror and the second mirror may be curved mirrors. This may facilitate confining the laser radiation and the frequency converted components inside the multipass arrangement. Moreover, this may render an optional use of dispersive optical elements for beam confinement obsolete, such as one or more optical lenses, and hence reduce the optical dispersion experienced by the laser radiation and/or the frequency converted components when propagating through the multipass arrangement. Hence, this may facilitate using the device with ultrafast laser pulses having a FWHM pulse duration in the range of 100 fs or less.

The first mirror and the second mirror may have a concave curvature. The first mirror and the second mirror may be arranged such that their focal lengths overlap inside the multipass arrangement. This may facilitate confining the beams of the laser radiation and/or the frequency converted components inside the multipass arrangement.

Alternatively, one of the first mirror and the second mirror may have a concave curvature and the other one of the first mirror and the second mirror may have a convex curvature or no curvature (i.e., may be flat). The first mirror and the second mirror may be arranged such that their focal lengths overlap outside the multipass arrangement. Therefore, the distance between the first mirror and the second mirror may be chosen shorter than in a case of two concave mirrors, as no focal plane is required inside the multipass arrangement.

Hence, this configuration may allow providing the device in a compact manner and avoiding small beam diameters at the surfaces of the first mirror and the second mirror, which could otherwise cause a potential risk of laser induced damages for the first and the second mirror. Consequently, this configuration may be inter alia beneficial when using the device with laser radiation having a particularly high peak power.

The radius of curvature of the first mirror may be different from a radius of curvature of the second mirror. The multipass arrangement may have an asymmetrical arrangement in which the first mirror and the second mirror may be arranged such that their focal lengths overlap inside the multipass arrangement. Due to the different radii of curvature of the first mirror with respect to the second mirror, their focal lengths differ from each other, thus, resulting in a different distance of the first mirror and the second mirror from the focal plane leading to an asymmetrical arrangement of the multipass arrangement. The first mirror and the second mirror may differ in the lateral extension, i.e, in their diameter in case of mirrors having a round shape. As the mirror having a smaller radius of curvature is closer to the focal plane, the beam waist of the laser radiation and the frequency converted components at this mirror may be smaller than for the mirror having a larger radius of curvature and, hence, a smaller diameter may be sufficient for this mirror. This may allow providing the device in a compact manner.

The linear medium may comprise a gaseous linear optical medium. The device may be adapted to allow a variation of a pressure and/or a temperature of the gaseous linear optical medium to adjust the optical length of the linear optical medium. The gas pressure and/or the temperature may be used to vary the linear refractive index of the linear medium and by this to vary the optical path length of the laser radiation and the frequency converted components propagating through the linear optical medium.

The linear optical medium may comprise at least one solid linear optical medium. The device may be adapted to allow a variation of an angle of the solid linear medium with respect to the optical path of the laser radiation to adjust the optical length of the linear optical medium. The solid linear optical medium may be provided as one or more phase adjustment plate arranged within the multipass arrangement, such that the laser radiation and the frequency converted components propagate through the solid linear optical medium at least once (in some optional embodiments twice) in each roundtrip. This may allow providing a linear optical medium having a higher optical dispersion than vacuum, air or many gases. Accordingly, this may allow achieving a considerable phase shift between the laser radiation and the frequency converted components in a very compact solid linear optical medium and in a short optical length. Moreover, this may allow varying the optical length of the linear optical medium by tilting the solid linear optical medium with respect to the propagation direction.

The nonlinear optical medium may comprise or consist of an isotropic solid nonlinear optical medium, in particular ZnS and/or ZnSe and/or ZnTe and/or CdTe and/or InP and/or InAs and/or InSb and/or GaP and/or GaSb and/or GaAs. These materials may offer a high second order susceptibility and, thus, allow a high frequency conversion efficiency of laser radiation by a three-wave mixing process. The AIIIBV material may be a material comprising or consisting of elements of the third main group of the periodic table (indicated by AIII) and elements of the fifth main group (indicated by BV), such as GaAs and InP. By using an isotropic solid nonlinear optical medium the requirements regarding the parameters of the solid nonlinear optical medium and its arrangement may be reduced. The requirements regarding the crystallographic orientation and/or the thickness of the isotropic solid nonlinear optical medium may be reduced as compared to an anisotropic nonlinear optical medium. Isotropic nonlinear optical media do not exhibit different phase matching conditions for different angles but may exhibit large nonlinear coefficients. Hence, using an isotropic nonlinear optical medium does not necessarily require a specific crystallographic orientation of the nonlinear optical medium. A thickness of the isotropic nonlinear optical medium may be chosen to correspond to an odd integer multiple of the coherence length of the interacting laser radiation and frequency converted components. The coherence length may usually be in the range from 10 $\mu$m to 100 $\mu$m and, thus, setting the thickness of the nonlinear optical medium to an odd integer multiple of the coherence length may be achieved by tilting the nonlinear optical medium with respect to the propagation direction of the laser radiation and the frequency converted components. When using an isotropic nonlinear optical medium, the conversion efficiency may be adjusted by varying the thickness of the isotropic nonlinear optical medium, which may be carried out by tilting the angle between the isotropic nonlinear optical medium and the propagation direction. A local maximum of the conversion efficiency may be found when the optical length of the isotropic nonlinear optical medium corresponds to an odd integer multiple of the coherence length, which may be defined as $l_c = \pi/\Delta k$, wherein $\Delta k$ is the wave vector mismatch of the laser radiation and the converted frequency components $\lambda$.

The nonlinear optical medium may comprise or consist of an anisotropic solid nonlinear optical medium, in particular b-Ba(BO$_2$)$_2$ (BBO) and/or LiB$_3$O$_5$ (LBO) and/or CsLiB$_6$O$_{10}$ (CLBO) and/or KTiOPO$_4$ (KTP) and/or LiNbO3 and/or LiTaO3 and/or LiGaS/Se/Te$_2$ (LGS/LGSe/LGT) and/or PbGa$_2$GeS/Se$_6$ ((PGGS/PGGSe) and/or BaGa$_2$GeS/Se$_6$ (BGGS/Se) and/or LiInS/Se$_2$ (LIS/Se) and/or ZnGeP$_2$ (ZGP) and/or GaSe and/or BaGa$_4$S/Se$_7$ (BGS/Se). By using an anisotropic solid nonlinear optical medium, a high one-pass efficiency of the nonlinear conversion may be obtained. It may be reached by the possibility of providing the phase-matching conditions by selecting a direction of beams propagation in the optical element and/or by choosing a suitable polarization of the laser radiation. Hence, using an anisotropic solid nonlinear optical medium may allow providing an anisotropic nonlinear optical medium having a larger thickness and, hence, a longer optical length, which may increase the conversion efficiency of each pass of the laser radiation through the nonlinear optical medium.

The anisotropic solid nonlinear optical medium may have a thickness of 10 mm or less and optionally of 3 mm or less. Such a thickness may provide a beneficial compromise between offering a sufficient conversion efficiency in each pass and reducing the manufacturing effort and the costs for providing such an anisotropic solid nonlinear optical medium. Due to the anisotropic solid nonlinear optical medium being arranged in a multipass arrangement and the laser radiation and the frequency converted components having multiple passes through the anisotropic solid nonlinear optical medium, a high total conversion efficiency can be yielded with an anisotropic solid nonlinear optical medium, which can be provided at low costs.

The nonlinear optical medium may comprise at least one pair of solid nonlinear optical elements being sequentially arranged in a mirrored manner, i.e. having flipped orientation. In other words, the pair of the solid nonlinear optical elements may be arranged such that one solid nonlinear optical element is turned by 180° with respect to the other solid nonlinear optical element of said pair. This may allow at least partly compensating a spatial walk-off between the laser radiation and the frequency converted components. A possible walk-off originating in the laser radiation and the frequency converted components propagating through the first solid nonlinear optical element of the pair, which may originate in the optical dispersion and/or in birefringent properties of the solid nonlinear optical element, may be at least partly compensated by the propagation through the second solid nonlinear optical element of the pair arranged in an opposite manner. Compensating at least partly a possible spatial walk-off between the laser radiation and the frequency converted components in each pass through the nonlinear optical medium may enhance the efficiency of the nonlinear optical processes in subsequent passes of the laser radiation and the frequency converted components through the nonlinear optical medium. The same may apply, mutatis mutandis, to a possible spatial walk-off between the laser radiation and an optional seed radiation when using the device in an optical parametric amplification scheme. The nonlinear optical medium may comprise multiple pairs of solid nonlinear optical elements. Moreover, the nonlinear optical medium may comprise in addition one or more single nonlinear optical elements.

The nonlinear optical elements of the at least one pair of nonlinear optical elements may be at least partly made of a birefringent material. The at least one pair of nonlinear optical elements may comprise two essentially identical nonlinear optical elements arranged in an opposite orientation with respect to each other. This may facilitate a proper compensation of the spatial walk-off due to the identical or at least very similar material parameters. "Essentially identical," as used in this context, means that the nonlinear optical elements differ only in properties not affecting the spatial walk-off and that possible differences, which may affect the spatial walk-off are within a range, are due to typically unavoidable manufacturing tolerances.

The nonlinear optical medium may comprise multiple nonlinear optical elements arranged in a sequential manner, wherein the nonlinear optical elements may be spaced from each other such that a phase shift between the laser radiation and frequency-converted components accumulated in a propagation through one of the nonlinear optical elements is at least partly compensated in a propagation through the space between the nonlinear optical element and the following nonlinear optical element. The multiple nonlinear optical elements may be identical to each other and may be arranged in a stacked manner. The nonlinear optical elements may be arranged in an equidistant manner, i.e. the spacing between consecutive nonlinear optical elements may be identical for some or all of the nonlinear optical elements. The at least partial compensation of the phase shift in a spacing between two consecutive nonlinear optical elements may involve an evolution of the phase shift such that a phase matching condition is satisfied again when arriving at the next nonlinear optical element. The phase shift between the laser radiation and frequency-converted components accumulated in the propagation through one of the nonlinear optical elements may be essentially fully compensated in the propagation through the space between the nonlinear optical element and the following nonlinear optical element. "Essentially fully compensated" means in this context that the phase shift at the beginning of the nonlinear optical element deviates from optimal at value $$\frac{\pi}{10}$$

or less.

The device may be configured to provide random phase-matching between the laser radiation and the frequency-converted components in each of the several roundtrips. The nonlinear optical medium may be provided as a polycrystalline material. This may further reduce the costs for providing the nonlinear optical medium and may facilitate or render phase-matching efforts obsolete. Random phase-matching may be referred to as random quasi phase-matching. Random quasi-phase-matching is possible in polycrystalline materials. Polycrystalline means in this context that the polycrystalline medium comprises a large amount of small (optionally tens of μm) tightly located single crystalline grains with random crystallographic orientation. Optionally, the linear size of each one single crystalline grain does not coincide with the coherence length (or an odd integer multiple of it) of the laser radiation. So the conditions for parametric conversion process may be different for each one of the individual grains. By some grains an increase of the intensity of the frequency converted components may be achieved, and by some other grains the intensity may be decreased. But after propagation through large amount of chaotically oriented grains, statistically the conditions for parametric conversion are favorable and the intensity of generated frequency converted components grows up. This mechanism of parametric conversion does not require specific crystallographic orientation of the nonlinear optical medium and does not require a specific polarization of the laser radiation.

The phase-matching may be adjusted such as to enhance and/or optimize the nonlinear optical conversion of the laser radiation into the frequency-converted components. The phase-matching may be optimized if a relative phase of the laser radiation and the frequency-converted components at a point of entry to the nonlinear optical medium essentially stays within a range such that the conversion from laser radiation into frequency converted components is accumulated in the majority of the passes. Such a range may be a range from 0 to π for the positive nonlinear coefficient of the nonlinear optical medium and π ... 2π for the negative one. For this range, a positive value of the second harmonic electric field amplitude derivative and, thus, an energy transfer from the laser radiation acting as pump beam to the frequency converted components acting as signal beam may be obtained. The range may also be defined by a derivative of electric field (or intensity) of the frequency-converted components $$\left(\frac{\partial A_{conv}}{\partial z}\right)$$

keeping the positive sign. This condition can be derived from a system of mathematical expressions describing the evolution of intensities of pumping beam and generated second harmonic radiation. Adjusting the phase-matching optionally comprises adjusting an optical length of the roundtrips and/or adjusting a pressure and/or a temperature of a gaseous linear medium within the multipass-arrangement.

The device may comprise multiple multipass arrangements being arranged such that the laser radiation is sequentially coupled into the multiple multipass arrangements to carry out multiple roundtrips in each of the multiple multipass arrangements. In other words, multiple multipass arrangements may be used in a sequential manner. Such a configuration may allow increasing the interaction length of the laser radiation with nonlinear optical media while using several compact multipass arrangements. The multiple multipass arrangements may be identical or different from each other. Several different nonlinear optical media may be provided, each in a different multipass arrangement, wherein each of the multipass arrangements may be optimized for the respective nonlinear optical medium and wavelength range. This may allow providing a high degree of flexibility for optimizing the device for the intended purpose. Each of the multiple multipass arrangements may comprise a Herriott cell or may be configured as a Herriott cell.

The method may further comprise coupling a seed radiation into the multipass arrangement for seeding the nonlinear optical conversion of a part of the laser radiation into the frequency-converted components. This may allow using optical parametric amplification for the nonlinear optical conversion of a part of the laser radiation. Moreover, this may allow obtaining a high conversion efficiency and/or tuning a wavelength of the frequency converted spectral components. The seed radiation may be at least partly spectrally overlapping with the frequency converted components to be generated, i.e. the seed radiation may spectrally overlap with the signal radiation of the optical parametric amplification used for generating the frequency converted components. A photon energy of the seed radiation may alternatively correspond to a difference of the between the photon energy of the laser radiation and the photon energy of the frequency converted components. In other words, the frequency converted components, whose further use may be intended, may correspond to an idler radiation generated in the optical parametric amplification.

The seed radiation may be coupled into the multipass arrangement such that the seed radiation and the laser radiation propagate in an essentially collinear manner. This may facilitate a spatial overlap of the signal radiation, the laser radiation and the frequency converted components during the propagation through the multipass arrangement and, hence, may result in a high conversion efficiency.

Further optional embodiments will be illustrated in the following with reference to the drawings.

It is understood by a person skilled in the art that the above-described features and the features in the following description and drawings are not only disclosed in the explicitly disclosed embodiments and combinations, but that also other technically feasible combinations as well as the isolated features are comprised by the disclosure. In the following, several optional embodiments and specific examples are described with reference to the drawings for illustrating optional embodiments without limiting the disclosure to the described embodiments.

The same reference signs are used for corresponding or similar features in different drawings.

DESCRIPTION

Figure 1:
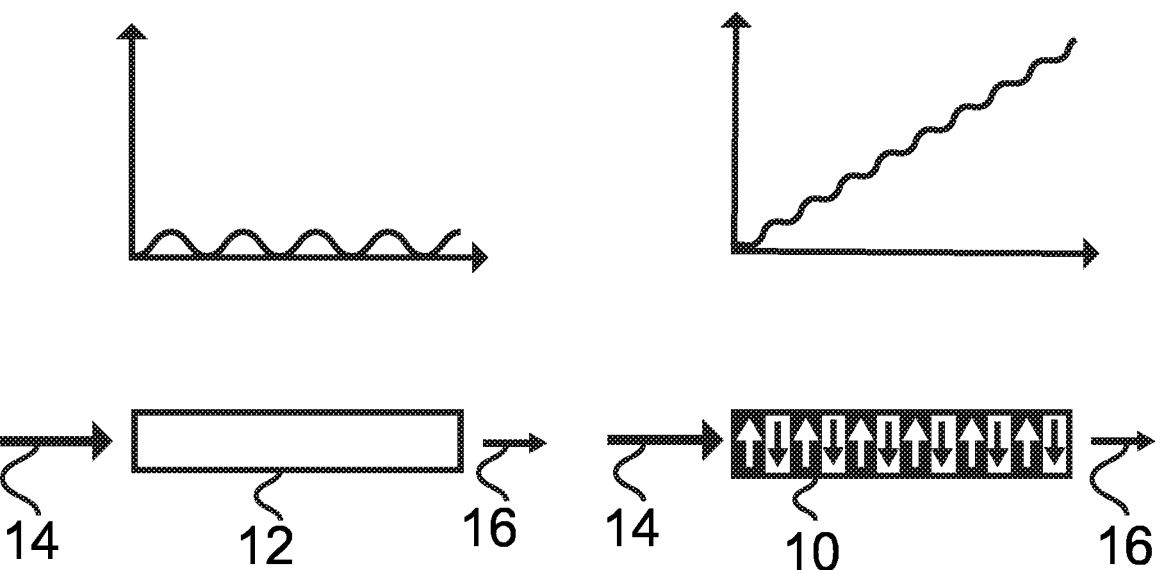
FIG. 1 illustrates the working principle of conventional quasi-phase-matching.

FIG. 1 illustrates the working principle of conventional quasi phase-matching in a periodically poled nonlinear optical crystal 10 (right side) compared to a homogeneous nonlinear optical crystal 12 offering no quasi phase-matching (left side). As schematically illustrated, in both crystals a laser radiation 14 is coupled into the respective nonlinear optical crystal 10, 12 and a part of the laser radiation 14 is converted into frequency converted photons 16, such as second harmonic radiation. The diagrams present the qualitative number of generated frequency-converted photons (vertical axis) over the propagation distance (horizontal axis) of the laser radiation through the respective nonlinear optical crystal 10, 12.

On the left-hand side in the case of a homogeneous nonlinear optical crystal the laser radiation 14 and the generated frequency-converted photons 16 periodically change between satisfying a phase-matching condition and unsatisfying a phase-matching condition due to the different velocities of the laser radiation 14 and the frequency converted photons 16 in the nonlinear optical crystal 12. Accordingly, in some intervals the satisfaction of the phase-matching condition results in a buildup of the frequency converted components while in other intervals a lack of phase-matching due to a spatial walk-off between the laser radiation 14 and the frequency-converted components 16 results in a depletion of the generated frequency-converted components 16. Accordingly, the use of a homogeneous crystal results in a poor conversion efficiency of frequency-generated photons.

On the right hand side in the case of a periodically poled nonlinear crystal, a quasi-phase-matching can be provided by periodically changing the crystal structure. This prevents the laser radiation 14 and the frequency-converted components from entering a regime of depleting the generated converted frequency components due to a lack of phase-matching. Hence, the number of generated frequency converted photons shows a continuous buildup over the entire propagation length through the periodically poled nonlinear optical crystal, which results in a much higher achievable conversion efficiency as compared to the case using a homogeneous crystal. The periodically poled structure allows maintaining the phase-matching over the entire propagation length and, thus, prevents a depletion of the previously generated frequency converted components. However, providing periodically poled structures is limited to a few crystalline materials, namely ferroelectrics, which limits the use of such structures with regard to the spectral characteristics and intensities of the laser radiation 14.

Figure 2:
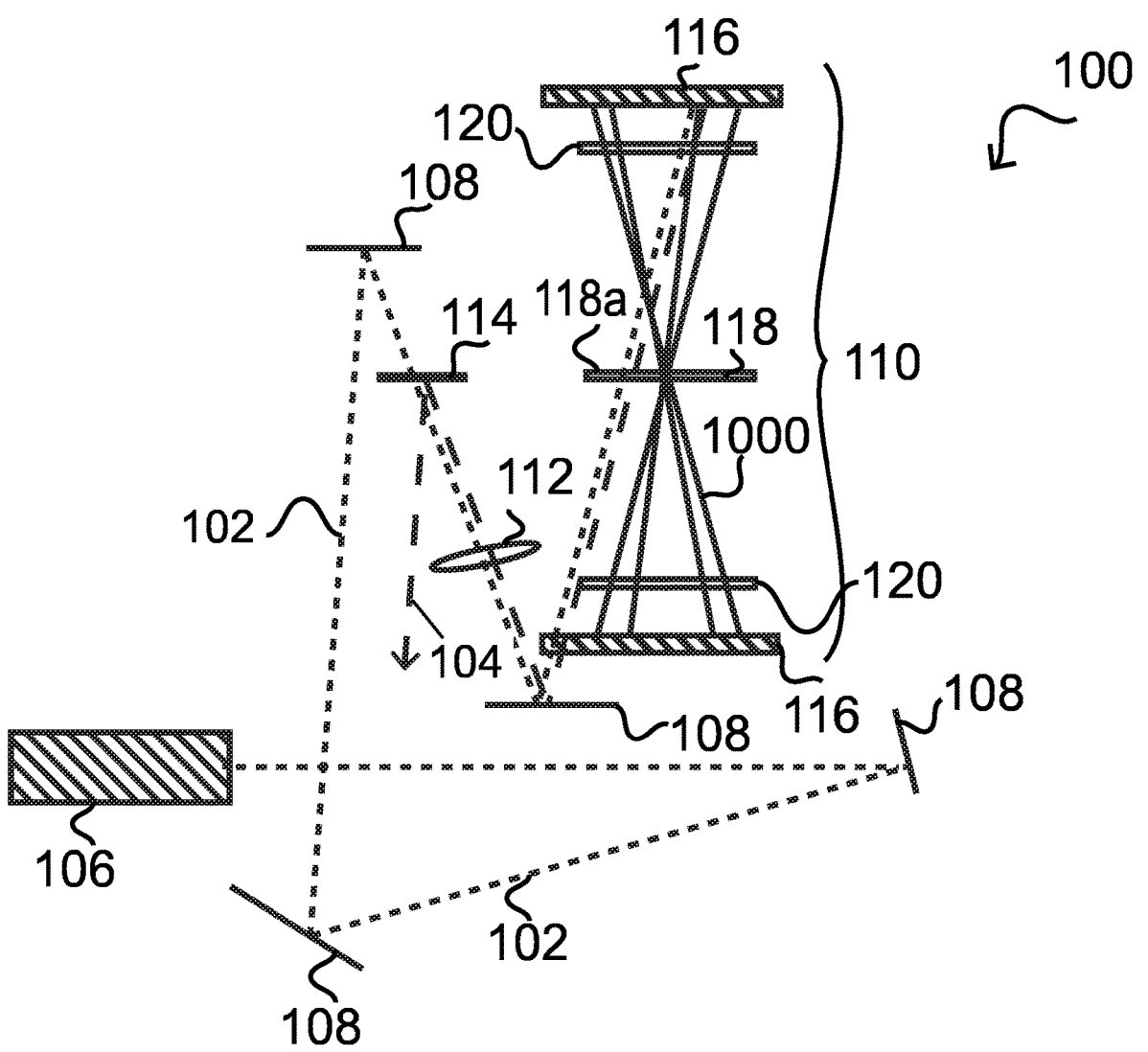
FIG. 2 shows a device for a nonlinear optical frequency-conversion of laser radiation into frequency-converted components according to an optional embodiment.

FIG. 2 schematically depicts a device 100 for a nonlinear optical frequency-conversion of laser radiation 102 into frequency-converted components 104 according to an optional embodiment. The laser radiation 102 is provided by a laser source 106. However, according to other embodiments, the laser radiation 102 may be any other kind of coherent optical radiation provided by a suitable other light source. The device 100 comprises several mirrors 108 for guiding the beam of laser radiation 102 and a multipass-arrangement 110. Moreover, the device 110 comprises an optical lens 112 for focusing the laser radiation 102 prior to coupling into the multipass arrangement as well as for recollimating the laser radiation and the frequency converted components after outcoupling from the multipass arrangement. A spectral filter 114 being transparent for the laser radiation 102 and reflective for the frequency converted components 104 allows separating the frequency converted components 104 from the laser radiation 102 for a further use. For instance, the spectral filter may be a dichroic mirror.

The multipass arrangement 110 comprises a first mirror and a second mirror 116. The first and the second mirror 116 may be concave mirrors having a radius of curvature of 500 mm, which are arranged such that the laser radiation coupled into the multipass arrangement carries out multiple roundtrips in the multipass arrangement 110. In each roundtrip the laser radiation is propagating on a different path through the multipass arrangement, as indicated by the lines 1000. The device further comprises a nonlinear optical medium 118, which is arranged at least partly within the multipass arrangement. According to the presented embodiment the nonlinear optical medium 118 is provided as a solid nonlinear optical medium 118a having a second order nonlinear susceptibility $\chi^{(2)}$ and being suitable for three-wave mixing processes. The nonlinear optical medium 118 may be arranged in or close to the focal plane in order to ensure a small beam diameter and, hence, a high intensity of the laser radiation can be provided when passing through the nonlinear optical medium 118. Moreover, according to the presented embodiment the nonlinear optical medium 118 is arranged such that the laser radiation passes through the nonlinear optical medium twice in each roundtrip, i.e, in each pass though the focal plane. During each pass of the laser radiation 102 through the nonlinear optical medium 118 a part of the laser radiation 102 is converted into frequency-converted components based on the second order susceptibility $\chi^{(2)}$ of the nonlinear optical medium. The frequency-conversion of the laser radiation 102, thus, may be based on a three-wave-mixing process, such as second harmonic generation, sum-frequency-generation and/or difference-frequency-generation.

The laser radiation 102 and the generated frequency-converted components propagate in the multipass arrangement along a common beam path, which includes at least five passes through the nonlinear optical medium. In some embodiments, the common beam path may include at least ten or even more than 100 passes through the nonlinear optical medium 118. This may be achieved by providing the first and the second mirror 116 as highly reflective mirrors for the laser radiation 102 and for the frequency converted components 104. The multiple passes through the nonlinear optical medium 118 allow accumulating a significant efficient interaction length of the laser radiation 102 and the nonlinear optical medium 118. In an optional embodiment, the nonlinear optical medium may be provided as a periodically poled nonlinear optical crystal, which may further increase the conversion efficiency.

The linear optical medium 120 may comprise or consist of crystalline quartz, which is used as a suitable nonlinear material for quasi phase-matching second harmonic generation of laser radiation having a central wavelength of about 1 μm. Crystalline quartz offers a low difference between the ordinary and extraordinary refractive indices $n_o$ and $n_e$ that allow considering this material as anisotropic, especially in a z-cut orientation. Said quartz crystal with a z-cut orientation is placed in the multipass arrangement, which may be a symmetric multipass Herriott cell formed by the first and second mirror 116, which are concave mirrors being highly reflective at wavelengths of 0.532 μm and 1.064 μm and have a radius of curvature of 500 mm. Pulsed laser radiation 102 provided by a Q-switched Nd: YAG laser as laser source 102 is introduced into the multipass arrangement 110 through a cutout in one of the mirrors 116. By tilting the nonlinear element 118 against the cell axis, the intensity of the generated frequency converted components 104 can be maximized. At the (local) maximum the thickness, i.e. the optical length, corresponds to an odd number of coherence lengths along the optical path in the nonlinear optical medium 118. By adjusting the angle of radiation input into the cell, the required number of passes inside the cell (14 passes) can be achieved and the radiation exits through the entrance cutout. A spectral filter 114 separates the second harmonic radiation, i.e. the frequency converted components, from the residual fundamental laser radiation 102.

In order to yield an even higher conversion efficiency for the frequency conversion of laser radiation 102 into frequency converted components 104, some optional embodiments may be configurable to adjust a phase-matching between the laser radiation 102 and the frequency-converted components. The phase-matching may be adjusted such as to enhance and/or optimize the nonlinear optical conversion of the laser radiation 102 into the frequency converted components 104. The presented embodiment comprises two solid linear optical media 120, which are arranged within the multipass arrangement 110, such that the laser radiation 102 and the frequency converted components 104 pass through each of the solid linear optical media 120 twice during each roundtrip. The linear optical media 120 do not exhibit a second order susceptibility $\chi^{(2)}$ which would result in the generation or depletion of frequency-converted components 104. However, due to the optical dispersion of the linear optical medium 120, the laser radiation 102 and the frequency converted components 104 propagate with different velocities, which thus increases or reduces a delay and/or varies a relative phase different between the laser radiation 102 and the frequency converted components 104. Hence, the linear optical medium allows adjusting and in particular resetting the phase-matching between the laser radiation 102 and the frequency converted components between two consecutive passes through the nonlinear optical medium 118. Therefore, a depletion of frequency-converted components 104 generated in preceding passes through the nonlinear optical medium 118 can be avoided and a continuous cumulative buildup of frequency-converted component can be realized in numerous passes through the nonlinear optical medium 118, similar to the use of a periodically poled nonlinear optical crystal (see FIG. 1).

For adjusting the phase-matching the device 100 may be configured such that the thickness of the linear optical media 120 and, hence, the optical length of the linear optical medium is suitable to result in a proper phase-matching between the laser radiation 102 and the frequency-converted components 104 at the following pass through the nonlinear optical medium.

Figure 3:
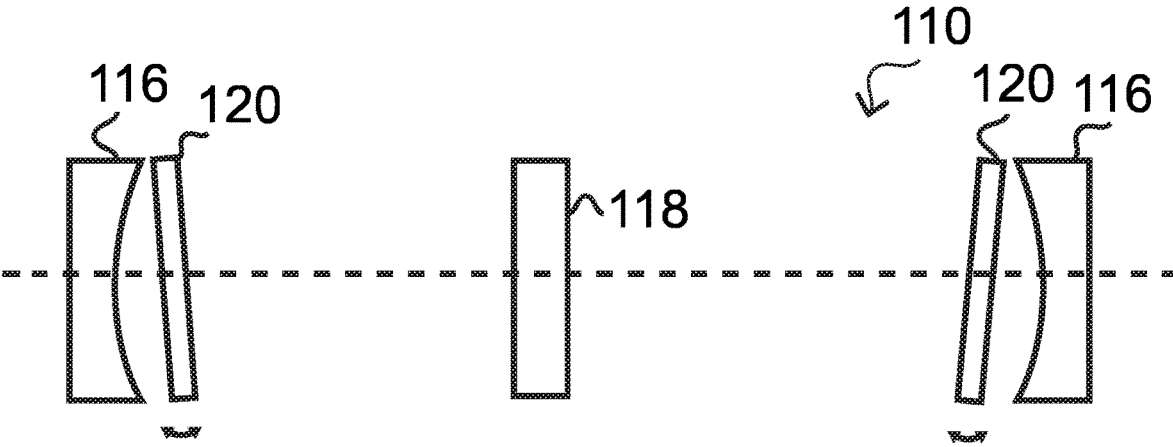
FIG. 3 schematically illustrates a further optional embodiment of a device for frequency-conversion of laser radiation.

In the following, a further optional embodiment of a device for frequency-conversion of laser radiation is explained with reference to FIG. 3. The device 100 comprises a nonlinear optical medium 118, which is an optically isotropic, nonlinear single-crystal, which is placed inside the multipass arrangement. The thickness should be an odd number of coherence lengths defined as $l_c=\pi/\Delta k$ Here $\Delta k$ is the wave vector mismatch in the nonlinear optical medium 118 for the wavelength of the laser radiation 102 and at the frequency converted components 104, i.e. of the second harmonic. The crystal angle of the nonlinear optical medium may be tuned such that the optical path length within the nonlinear optical medium matches an odd number of $l_c$. The position of the nonlinear element inside the cell is determined by the power density of the pump radiation, which might not exceed the damage threshold of the nonlinear optical medium 118. To couple the fundamental radiation into the arrangement, one of the mirrors 116 has a cutout or an aperture. Alternatively, the radiation can be guided into the cell by a separate, compact mirror that does not interfere with the propagation of laser radiation 102 and the frequency converted components 104 inside the multipass arrangement. Additionally, a solid linear optical medium 120 is provided as two plane-parallel plates 120 being installed between the nonlinear optical medium and the mirrors 116 of the multipass arrangement 110 (see FIG. 3). These plates 120 compensate the phase shift ($\Delta\varphi$) between the fundamental laser radiation 102 and the frequency converted components 104 during the propagation of the laser radiation 102 and frequency converted components 104 outside the nonlinear optical medium.

The laser radiation 102 is fed as an input beam through an opening in one of the mirrors 116 into the cell in the direction determined by the geometry of the multipass cell. When the radiation first passes through the nonlinear optical medium 118, a beam of frequency-converted components 104 is generated that collinearly propagates with the fundamental laser radiation 102 beam. Due to the absence of the phase-matching ($\Delta k \neq 0$) during the propagation, a relative phase ($\psi$) of the fundamental laser radiation 102 and the frequency converted components 104 changes, which prevents a further increase in the power of the frequency-converted components upon reaching the value $\psi=\pi$ for the positive nonlinear coefficient (d) and 0 for the negative one. When the relative phase is in the range from $\pi$ to $2\pi$ (for the d>0), energy would be transferred from the frequency converted components to the fundamental laser radiation 102 and, hence, the frequency converted components would be depleted. To ensure effective interaction of the frequency converted components 104 and fundamental laser radiation 102 throughout the entire coherence length at the time of the second pass through the nonlinear optical medium 118, the relative phase should ideally be $\psi=0$ (for the d>0 and $\Delta k>0$) at the beginning of the second and every further pass. The required phase difference is created by a plane-parallel plate 120 acting as the linear optical medium 120, which is located between the nonlinear optical medium 118 and the second mirror 116 of the multipass arrangement 110. To form the relative phase required for effective frequency-conversion, for example SHG, before a further passage of the laser radiation and the frequency-converted components through the nonlinear optical medium 118, a second plane-parallel plate 120 is provided between the first mirror 116 of the multipass arrangement and the nonlinear optical medium. The relative phase may be adjusted by slightly tilting the plate 120, which leads to an optical path length variation in the plate and, thus, to a variation in the phase delay between the laser radiation 102 and the frequency converted components 104. Then the process is repeated for the remaining roundtrips and passes until the remaining fundamental laser radiation 102 and the generated frequency-converted components leave the multipass arrangement on a common beam path. The output may be coupled out through the entrance hole, by a separate hole or by a compact mirror (scraper mirror) placed inside the multipass arrangement (not shown).

According to another example, an anisotropic nonlinear optical medium is provided, which is cut in a phase-matched direction. The nonlinear optical medium 118 is placed in the multipass arrangement, which may be a Herriott cell (HC). In addition to the nonlinear optical medium 118, one or two phase-shifting plates may be provided as a linear optical medium 120 to compensate a phase shift between fundamental laser radiation 102 and frequency converted components 104 occurring in a gas, such as air, within the multipass arrangement. AΘndNDL The phase-compensating plates 120 are placed near the mirrors 116 to compensate the phase shift between laser radiation 102 and frequency converted components 104 in the gas inside the multipass arrangement.

According to another example, it may be sufficient to place the nonlinear optical medium 118 near one of the mirrors 116 resulting in a small phase shift in the small gap between the mirror 116 and the nonlinear optical medium, which may be negligible. According to this embodiment, it is enough to use only one plate 120 to compensate the phase shift in the long section of the multipass arrangement 110.

In another example a gaseous linear optical medium may be used for adjusting the phase-matching. In gases, a difference between the refractive indices of the linear optical medium for the fundamental laser radiation and the frequency converted components, such as second harmonic radiation, depends on the temperature and pressure. Hence, it is possible to tune the phase shift for compensating the dispersion originating in the propagation through the nonlinear optical medium by changing the pressure and/or temperature of the gas serving as the linear optical medium. Thus, some optional embodiments may provide a gas cell for providing a gaseous environment having an adjustable pressure and/or temperature. In some optional examples, the multipass cell may comprise a gas cell through which the laser radiation and the frequency converted components propagate in each roundtrip. In another example, the multipass arrangement may be included in a gas cell or may be adapted as a gas cell. Hence, the pressure and/or the temperature of the gaseous linear optical medium may be adjusted inside the multipass cell. For instance, the multipass arrangement is placed in a sealed housing with an optical window for input and output of radiation. By tuning the pressure and/or the temperature in the sealed housing, the maximum value of the output signal may be achieved, which may correspond to a pressure and/or temperature providing a suitable adjustment of the phase-matching between consecutive passages through the nonlinear optical medium.

Figure 4:
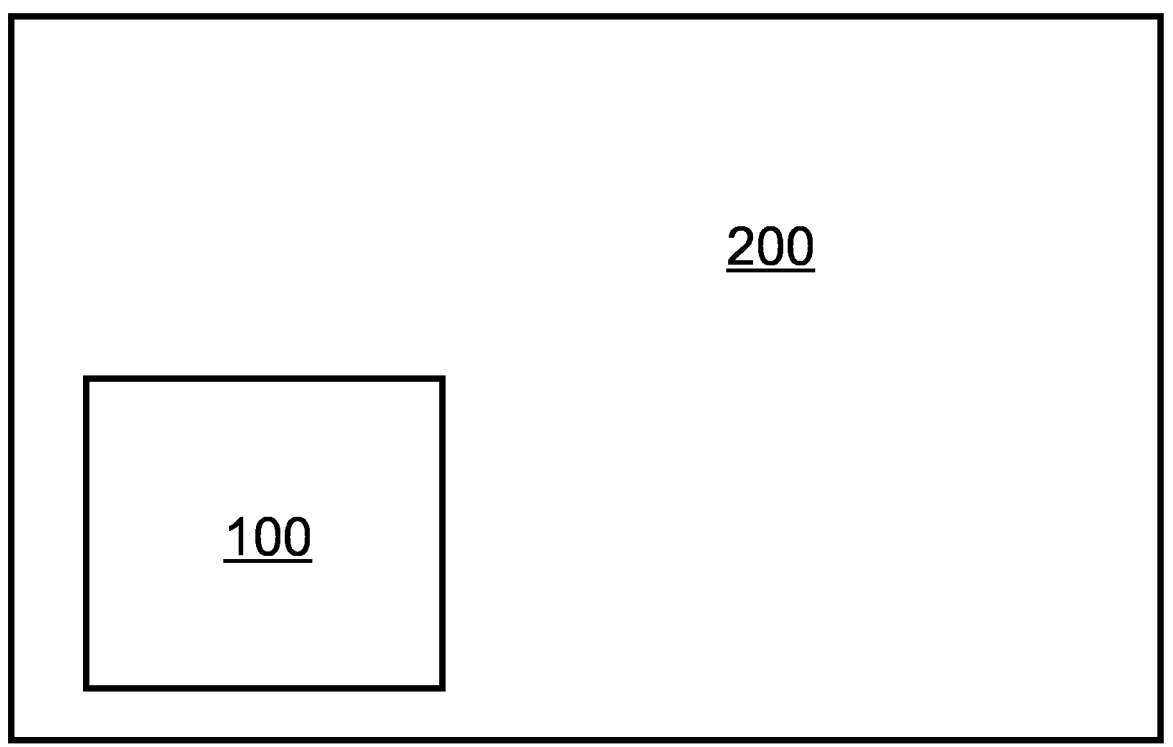
FIG. 4 schematically depicts a laser system comprising a device for a nonlinear optical frequency conversion of laser radiation.

FIG. 4 schematically depicts a laser system 200 comprising a device 100 for a nonlinear optical frequency conversion of laser radiation. The laser system 200 may be configured to output the frequency-converted components as a laser beam.

Figure 5A:
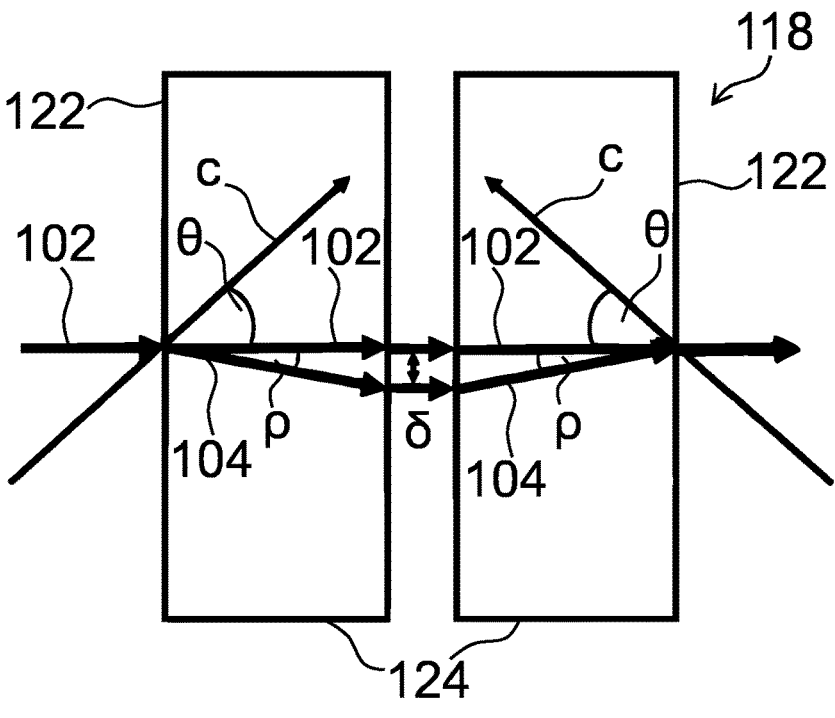
FIGS. 5A to 5C depict various embodiments of nonlinear optical media comprising multiple solid nonlinear optical elements.
Figure 5B:
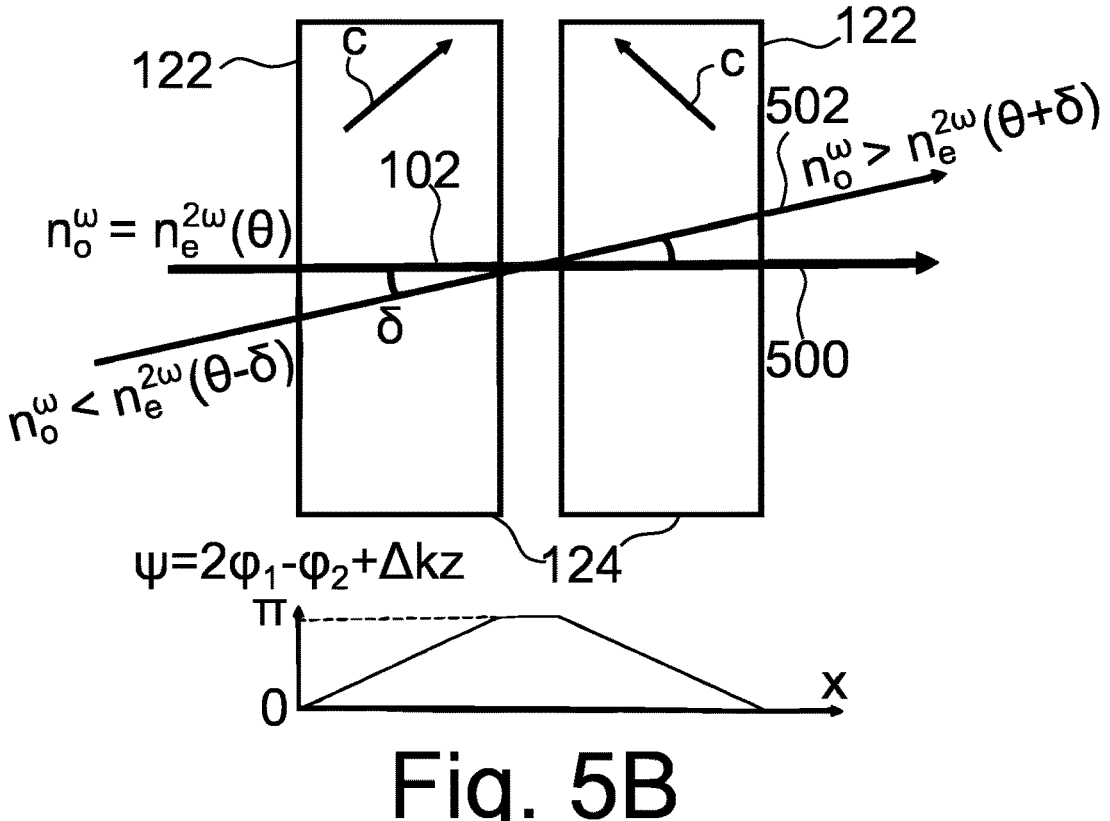
Figure 5C:
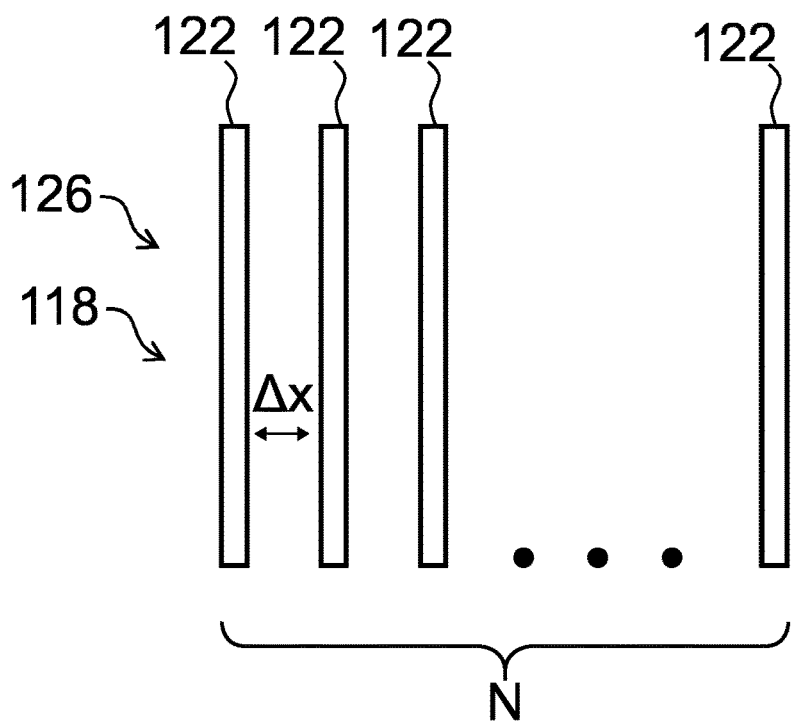

FIGS. 5A to 5C depict various examples of nonlinear optical media 118 comprising multiple solid nonlinear optical elements 122.

According to the example presented in FIG. 5A, the nonlinear optical medium 118 comprises a pair 124 of solid nonlinear optical elements 122, wherein the solid nonlinear optical elements 122 forming the pair 124 are essentially identical to each other but arranged in an opposing orientation with respect to each other. Other examples of nonlinear optical media may comprise several pairs 124 of solid nonlinear optical elements 122. Each of the solid nonlinear optical elements 122 is formed as a birefringent nonlinear optical crystal having an optical axis indicated by arrow c.

A part of the laser radiation 102 propagating through the nonlinear optical medium is converted into frequency converted components 104. The frequency converted components 104 experience a spatial walk-off in the first solid nonlinear optical material 122 with respect to the laser radiation 102 due to the birefringent properties of the solid nonlinear optical elements 122. In the second nonlinear optical element 122 being arranged such as to have an opposite crystallographic orientation with respect to the first nonlinear optical element 122, the direction of angular deviation of the frequency converted components 104 with respect to the laser radiation 102 changes to opposite and compensates the spatial shift δ originating in the spatial walk-off in the first nonlinear optical element 122 between laser radiation 102 and the frequency converted components 104. This configuration allows to improve and/or fully restore the spatial overlap of laser radiation 102 and the frequency converted components 104 by using a pair 124 of opposingly arranged solid nonlinear optical elements 122.

An angle ρ of the spatial walk-off is determined by $$\rho = -\frac{1}{n_e}\frac{\partial n_e}{\partial \theta}$$

wherein θ indicates an angle between the propagation direction of the laser radiation 102 and the optical axis 122 of the respective solid nonlinear optical element and $n_e$ the extraordinary refractive index of the birefringent solid nonlinear optical element 122 at the wavelength of the frequency converted components.

An additional effect of using a nonlinear optical medium 118 having a pair 124 of two opposing solid nonlinear optical elements 122 is explained with reference to FIG. 5B.

The presented configuration allows a compensation of the phase-shift between interacting beams, i.e. the laser radiation 102, the frequency converted components 104 and optionally the seed radiation, caused by a phase-mismatch in schemes with nonlinear optical media 118 which can be cut in a phase-matched orientation. This effect is explained in FIG. 5B based on type-I second harmonic generation as an example. In the multipass arrangement 110 the laser radiation 102 and the frequency converted components 104 propagate with and angular deviation from the optical axis c of the nonlinear optical elements 122 and accordingly from the phase-matched direction of the nonlinear optical elements 122. This deviation leads to a phase mismatch between the laser radiation 102 and the frequency converted components (Δk≠0) because of a difference of the phase velocities of the laser radiation 102 and the frequency converted components 104. The sign of the phase mismatch Δk depends on sign of the difference of the refractive index of the nonlinear optical elements 122 at the wavelength of the frequency converted components 104 and at the wavelength of the laser radiation 102, which may be expressed as $$n_e^{2\omega} - n_o^{\omega}$$

and which is different for the two nonlinear optional elements 122 having opposing orientations. The indices "o" and "e" indicate the ordinary and the extraordinary refractive index of the birefractive nonlinear optical elements 122 at the respective wavelengths, respectively. Thus, the relative phase ψ, which defines the direction of the energy transfer between the laser radiation 102 and the frequency converted components, increases in the first nonlinear optical element 122 and decreases in the second nonlinear optical element, as shown in the graph in FIG. 5B. For identical nonlinear optical elements 122 of the pair 124 and a perfect opposite orientation, the relative phase ψ restores its initial value it had prior to entering the first nonlinear optical element 122 when exiting the second nonlinear optical element 122. Thus, the relative phase ψ becomes more uniform for the laser radiation 102 and the frequency converted components 104 when propagating through the multipass arrangement 110 which facilitates the phase-shift compensation and allows for efficient nonlinear conversion. In FIG. 5B, axis 500 indicates the direction of phase-matching, which represents an axis along which the condition below is met $$n_o^{\omega} = n_e^{2\omega}(\theta).$$

The angle θ indicates the phase matching angle, $$n_o^{\omega}$$

indicates the ordinary refractive index experienced by the laser radiation 102, $$n_e^{2\omega}(\theta)$$

indicates the extraordinary refractive index experienced by the frequency converted components 104, c indicates the orientation of the optical axis of the nonlinear optical elements 122, δ the deviation angle of the propagation directions of the laser radiation 102 and the frequency converted components from the phase matched direction, ψ the relative phase being ψ=2φ$_1$−φ$_2$+Δk$_z$, wherein φ$_1$ and φ$_2$ indicate the phase of the laser radiation 102 and of the frequency converted components 104, respectively, and Δk$_z$ their wave vector mismatch.

As further indicated in FIG. 5B by axis 502, the condition in the first nonlinear optical element 122 is $$n_o^{\omega} < n_e^{2\omega}(\theta - \delta),$$

wherein in the second optical element the condition is reversed and specified as $$n_o^{\omega} > n_e^{2\omega}(\theta + \delta).$$

The angle δ corresponds to the deviation of the propagation direction from the phase matching direction.

FIG. 5C depicts a further optional embodiment of a nonlinear optical medium 118 having a stack 126 of multiple nonlinear optical elements 122. The individual nonlinear optical elements 122 of the stack 126 are spaced from each other at a distance Δx. During a propagation of the laser radiation 102 and the frequency converted components 104 through the spacing $\Delta x$ a possible phase mismatch accumulated in the precedent nonlinear optical element 122 is at least partly compensated such that the laser radiation 102 and the frequency converted components 104 enter the following nonlinear optical element 104 at a reduced phase mismatch or fully restored phase matching. The stack 126 may for instance comprise at least three, optionally at least six and optionally at least 12 nonlinear optical elements. In FIG. 5C, the reference sign N indicates number of nonlinear optical elements 122 comprised by the stack 126.

Figures 6A, 6B:
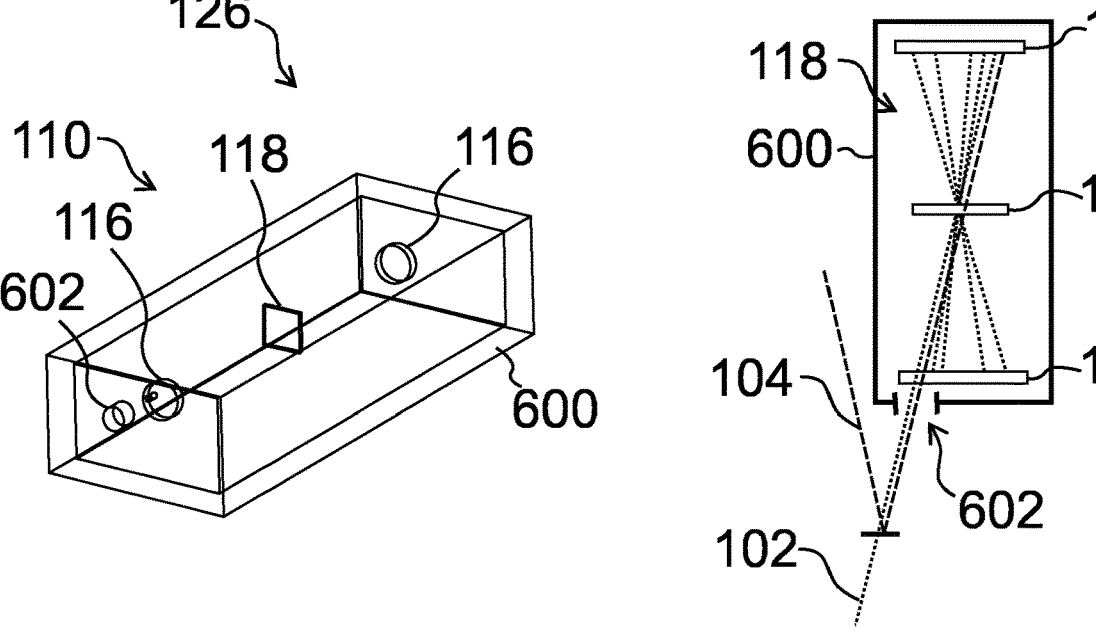
FIGS. 6A and 6B depict a device for a nonlinear optical frequency-conversion of laser radiation according to an optional embodiment.

FIGS. 6A and 6B depict a device 100 for a nonlinear optical frequency-conversion of laser radiation 102 according to an optional embodiment. According to the presented embodiment the multipass arrangement 118 is integrated into a gas cell 600. The gas cell 600 is equipped with a window 602 for coupling the laser radiation 102 into the gas cell and the multipass arrangement 110 and the laser radiation and the frequency converted components 104 in and out of the gas cell 600 and the multipass arrangement 110. The gas cell 600 may confine a gas serving as a gaseous linear optical medium 120. Moreover, a solid nonlinear optical medium 118 is schematically indicated in FIG. 6A.

FIG. 6B shows the gas cell 600 and the multipass arrangement in a schematic sketch indicating the propagation paths of the laser radiation 102 and the frequency converted components 104. The first mirror 116 and the second mirror 116 may be dichroic mirrors and in particular dispersive mirrors for at least partly compensating optical dispersion experienced by the laser radiation 102 and/or the frequency converted components inside the multipass arrangement 118 and/or the gas cell 600.

REFERENCE SYMBOLS

10 periodically poled nonlinear optical crystal
12 homogeneous nonlinear optical crystal
14 laser radiation
16 frequency converted photons
100 device for nonlinear optical frequency-conversion
102 laser radiation
104 frequency converted components
106 laser source
108 mirror
110 multipass arrangement
112 optical lens
114 spectral filter
116 first and second mirror of multipass arrangement
118 nonlinear optical medium
118*a* solid nonlinear optical medium
120 linear optical medium
122 solid nonlinear optical element
124 pair of solid nonlinear optical elements
126 stack of solid nonlinear optical elements
200 laser system
500 phase matching direction
502 propagation direction deviating from phase matching direction
600 gas cell
602 window
1000 beam path through multipass arrangement
C optical axis of nonlinear optical element
$\delta$ spatial shift
$\rho$ angle of spatial walk-off
$\theta$ angle between the propagation direction of the laser radiation and optical axis of nonlinear optical element
$\psi$ generalized phase $\varphi_1$ phase of laser radiation
$\varphi_2$ phase of the second harmonic

What is claimed is:

1. Device for a nonlinear optical frequency-conversion of laser radiation, the device comprising:

a multipass arrangement being arranged such that a laser radiation coupled into the multipass arrangement carries out multiple roundtrips in the multipass arrangement;

a nonlinear optical medium arranged at least partly within the multipass arrangement such that at least in several of the roundtrips the laser radiation coupled into the multipass arrangement passes through the nonlinear optical medium to carry out a nonlinear optical conversion of a part of the laser radiation propagating through the nonlinear optical medium into frequency-converted components based on a second order susceptibility $x^{(2)}$ of the nonlinear optical medium;

wherein the device is configured such that the laser radiation and the frequency-converted components propagate in the multipass arrangement along a common beam path including at least five passes through the nonlinear optical medium.

2. The device according to claim 1, wherein the laser radiation and the frequency-converted components are concentrically centered at a different position of the nonlinear optical medium at each of the at least five passes through the nonlinear optical medium.

3. The device according to claim 1, wherein the multipass arrangement is arranged such that a laser radiation coupled into the multipass arrangement carries out at least ten and optionally not more than 100 roundtrips in the multipass arrangement, and wherein the common beam path optionally includes at least ten passes through the nonlinear optical medium.

4. The device according to claim 1, wherein the nonlinear optical conversion of the laser radiation into the frequency-converted components is essentially solely based on the second order susceptibility $x^{(2)}$ of the nonlinear optical medium.

5. The device according to claim 1, wherein the nonlinear optical conversion of the laser radiation into the frequency-converted components is based on three wave mixing and is optionally based on at least one of following nonlinear optical processes: second harmonic generation, sum-frequency generation, optical parametric amplification, difference-frequency generation and optical rectification.

6. The device according to claim 1, wherein the device is configurable to adjust a phase-matching between the laser radiation and the frequency-converted components in each of the several roundtrips.

7. The device according to claim 6, wherein the phase-matching is adjustable such as to enhance and/or optimize the nonlinear optical conversion of the laser radiation into the frequency-converted components.

8. The device according to claim 1, further comprising a linear optical medium arranged at least partly within the multipass arrangement such that the laser radiation passes through the linear medium at least in those several roundtrips, in which the laser radiation passes at least once through the nonlinear optical medium.

9. The device according to claim 8, wherein the linear optical medium comprises vacuum and/or a gaseous medium and/or a solid linear optical medium, and wherein the device is configurable to adjust a phase-matching by adjusting an optical path length in the linear optical medium.

10. The device according to claim 9, wherein the multipass arrangement has at least a first mirror and a second mirror and in each roundtrip the laser radiation is reflected at least once from the first mirror to the second mirror and at least once from the second mirror to the first mirror.

11. The device according to claim 10, wherein the first mirror and the second mirror are highly-reflective for the laser radiation and for the frequency-converted components.

12. The device according to claim 10, wherein the device is adapted to allow a variation of a distance between the first mirror and the second mirror to adjust the optical path length of the linear optical medium.

13. The device according to claim 10, wherein the first mirror and/or the second mirror is adapted to adjust at least partly the phase-matching between the laser radiation and the frequency-converted components.

14. The device according to claim 13, wherein the first mirror and the second mirror comprise a dispersive coating for adjusting at least partly the phase-matching between the laser radiation and the frequency-converted components.

15. The device according to claim 10, wherein the first mirror and the second mirror are curved mirrors.

16. The device according to claim 15, wherein the first mirror and the second mirror have a concave curvature.

17. The device according to claim 15, wherein one of the first mirror and the second mirror has a concave curvature and the other one of the first mirror and the second mirror has a convex curvature.

18. The device according to claim 15, wherein a radius of curvature of the first mirror is different from a radius of curvature of the second mirror.

19. The device according to claim 18, wherein the multipass arrangement has an asymmetrical arrangement.

20. The device according to claim 9, wherein the linear comprises a gaseous linear optical medium and wherein the device is adapted to allow a variation of a pressure and/or a temperature of the gaseous linear optical medium to adjust the optical path length of the linear optical medium.

21. The device according to claim 9, wherein the linear optical medium comprises at least one solid linear optical medium and wherein the device is adapted to allow a variation of an angle of the solid linear medium with respect to the optical path of the laser radiation to adjust the optical path length of the linear optical medium.

22. The device according to claim 1, wherein the nonlinear optical medium comprises or consists of an isotropic solid nonlinear optical medium, the nonlinear optical medium being ZnS and/or ZnSe and/or ZnTe and/or CdTe and/or InP and/or InAs and/or InSb and/or GaP and/or GaSb and/or GaAs.

23. The device according to claim 15, wherein the nonlinear optical medium has a nonlinear coefficient $d_{eff}$ of 0.2 pm/V or higher.

24. The device according to claim 1, wherein the nonlinear optical medium comprises or consists of an anisotropic solid nonlinear optical medium, the anisotropic solid nonlinear optical medium being b-Ba(BO$_2$)$_2$ (BBO) and/or LiB$_3$O$_5$ (LBO) and/or CsLiB$_6$O$_{10}$ (CLBO) and/or KTiOPO$_4$ (KTP) and/or LiNbO3 and/or LiTaO3 and/or LiGaS/Se/Te$_2$ (LGS/LGSe/LGT) and/or PbGa$_2$GeS/Se$_6$ (PGGS/PGGSe) and/or BaGa$_2$GeS/Se$_6$ (BGGS/Se) and/or LiInS/Se$_2$ (LIS/Se) and/or ZnGeP$_2$ (ZGP) and/or GaSe and/or BaGa$_4$S/Se$_7$ (BGS/Se).

25. The device according to claim 24, wherein the anisotropic solid nonlinear optical medium has a thickness of 10 mm or less and optionally of 3 mm or less.

26. The device according to claim 1, wherein the nonlinear optical medium comprises at least one pair of solid nonlinear optical elements being sequentially arranged such that respective optical axes of the nonlinear optical elements are opposing each other.

27. The device according to claim 26, wherein the nonlinear optical elements of the at least one pair of nonlinear optical elements are at least partly made of a birefringent material.

28. The device according to claim 26, wherein the at least one pair of nonlinear optical elements comprises two essentially identical nonlinear optical elements arranged in an opposite orientation with respect to each other.

29. The device according to claim 1, wherein the nonlinear optical medium comprises multiple nonlinear optical elements arranged in a sequential manner, wherein the nonlinear optical elements are spaced from each other such that a phase shift between the laser radiation and frequency-converted components accumulated in a propagation through one of the nonlinear optical elements is at least partly compensated in a propagation through the space between the nonlinear optical element and a following nonlinear optical element.

30. The device according to claim 29, wherein the phase shift between the laser radiation and frequency-converted components accumulated in the propagation through one of the nonlinear optical elements is essentially fully compensated in the propagation through the space between the nonlinear optical element and the following nonlinear optical element.

31. The device according to claim 1, wherein the device is configured to provide random phase-matching between the laser radiation and the frequency-converted components in each of the several roundtrips.

32. The device according to claim 1, wherein the multipass arrangement comprises a Herriott cell or is configured as a Herriott cell.

33. The device according to claim 1, wherein the device comprises multiple multipass arrangements being arranged such that the laser radiation is sequentially coupled into the multiple multipass arrangements to carry out multiple roundtrips in each of the multiple multipass arrangements.

34. The device according to claim 21, wherein each of the multiple multipass arrangements comprises a Herriott cell or is configured as a Herriott cell.

35. Laser system comprising the device for nonlinear optical conversion of laser radiation according to claim 1.

36. Method for frequency-converting laser radiation, the method comprising:

coupling the laser radiation into a multipass arrangement such that the laser radiation coupled into the multipass arrangement carries out multiple roundtrips in the multipass arrangement, wherein a nonlinear optical medium is arranged at least partly within the multipass arrangement and at least in some of the multiple roundtrips the laser radiation passes through the nonlinear optical medium and carries out a nonlinear optical conversion of a part of the laser radiation into frequency-converted components;

adjusting a phase-matching between the laser radiation and the frequency-converted components between two consecutive passes of the laser radiation through the nonlinear optical medium.

37. The method according to claim 36, wherein the phase-matching is adjusted such as to enhance and/or optimize the nonlinear optical conversion of the laser radiation into the frequency-converted components.

38. The method according to claim 36, wherein adjusting the phase-matching comprises adjusting an optical path length of the roundtrips and/or adjusting a pressure and/or a temperature of a gaseous linear medium within the multi-pass-arrangement.

39. The method according to claim 36, further comprising coupling a seed radiation into the multipass arrangement for seeding the nonlinear optical conversion of a part of the laser radiation into the frequency-converted components.

40. The method according to claim 39, wherein the seed radiation is at least partly spectrally overlapping with the frequency-converted components.

41. The method according to claim 39, wherein a photon energy of the seed radiation corresponds to a difference between the photon energy of the laser radiation and the photon energy of the frequency-converted components.

42. The method according to claim 39, wherein the nonlinear optical conversion of a part of the laser radiation includes or consists of optical parametric amplification.

43. The method according to claim 39, wherein the seed radiation is coupled into the multipass arrangement such that the seed radiation and the laser radiation propagate in an essentially collinear manner.

* * * * *